United States Patent [19]

Middlemiss

[11] Patent Number: 4,644,104
[45] Date of Patent: Feb. 17, 1987

[54] SECURITY SYSTEM INCLUDING A PLURALITY OF CENTRALLY PROGRAMMABLE LOCKING ASSEMBLIES

[76] Inventor: William Middlemiss, 3935 N.W. 38 Ave., Ft. Lauderdale, Fla. 33309

[21] Appl. No.: 849,205

[22] Filed: Apr. 7, 1986

[51] Int. Cl.$^4$ ............................................. H04M 11/00
[52] U.S. Cl. .................................................. 379/103; 379/104; 235/382.5; 340/825.32; 70/269
[58] Field of Search .................... 179/2 A, 2 AM, 2 R

[56] References Cited

U.S. PATENT DOCUMENTS

| | | | |
|---|---|---|---|
| 3,801,742 | 4/1974 | O'Brien et al. | 179/2 A |
| 3,969,584 | 7/1976 | Miller et al. | 179/2 A |
| 4,113,986 | 9/1978 | Clement et al. | 179/2 A |
| 4,436,958 | 3/1984 | Hansen et al. | 179/2 A |

Primary Examiner—Gene Z. Rubinson
Assistant Examiner—David R. Schuster
Attorney, Agent, or Firm—John Cyril Malloy

[57] ABSTRACT

The present invention is directed towards a security system for a multi-unit facility such as a hotel wherein access to each unit or room is accomplished through a door structure or like closure which incorporates a separate locking assembly. The locking facility is of the keyless entry type wherein a preset code is fed into an electronically controlled lock through a plurality of finger operated switches (fingerboard) for authorized entry. Each of the actuating facilities associated with each closure is capable of having a stored preset code changed through operation of a microprocessor. Telephone lines interconnect the activating and locking facilities associated with each room to a central control facility, for example, in the office of a hotel.

9 Claims, 3 Drawing Figures

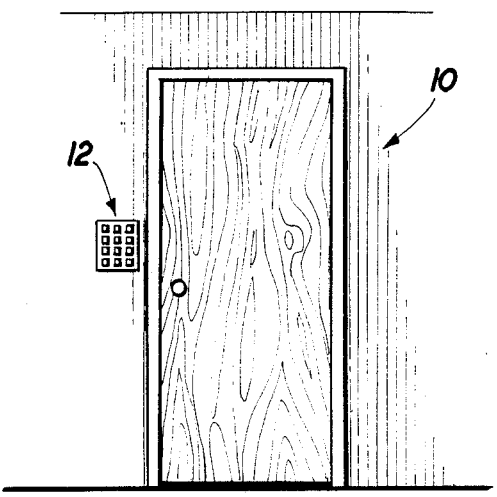
FIG. 1
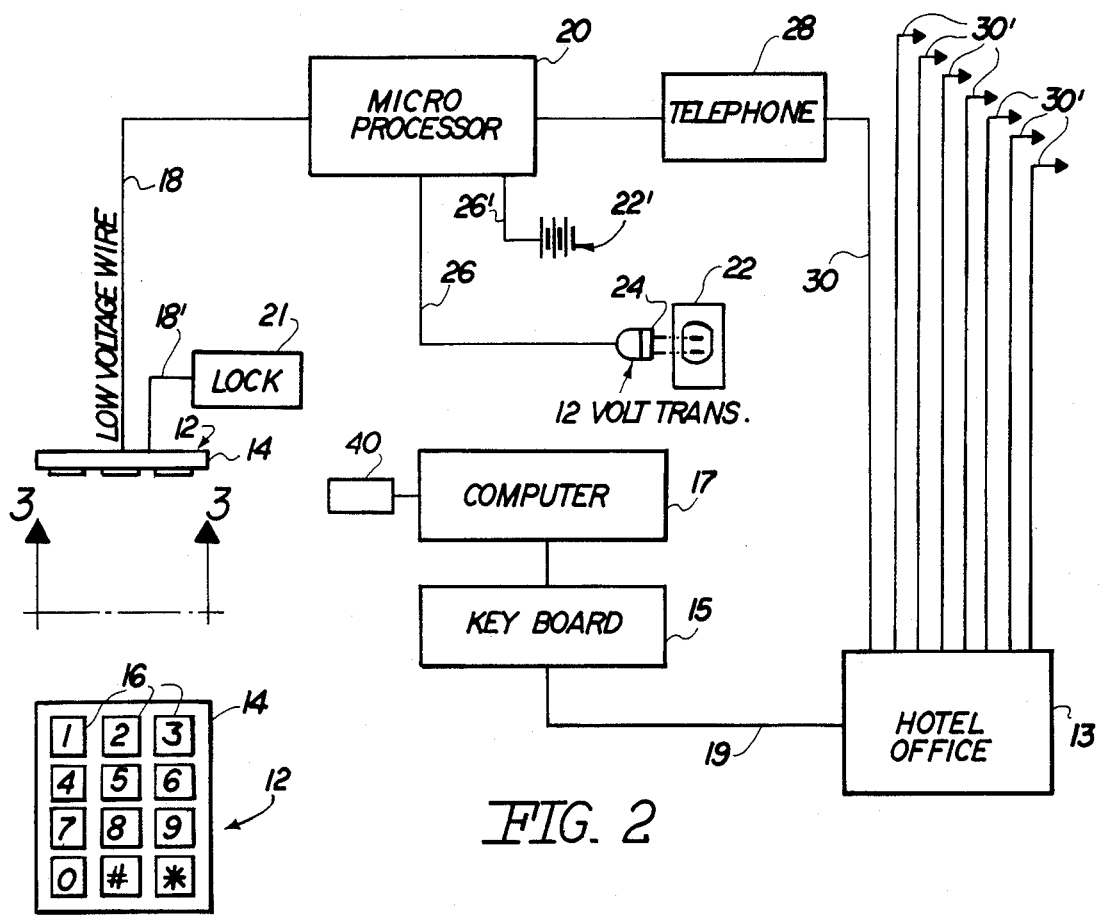
FIG. 2
FIG. 3

SECURITY SYSTEM INCLUDING A PLURALITY OF CENTRALLY PROGRAMMABLE LOCKING ASSEMBLIES

BACKGROUND OF THE INVENTION

1. Field of the Invention

This invention relates to a security system comprising a plurality of locking assemblies associated with each door structure of each of a plurality of rooms such as in a hotel. Each of the locking assemblies is actuated by presenting a preset code wherein the code may be changed at a central location such as the hotel office by an adequate computer facility connected to each of the locking assemblies and associated keyless entry activating means by a conventional telephone line.

2. Description of the Prior Art

Security and the provision of adequate locking facilities for each room, door or closure in a hotel or like environment is to particular importance. Typically, in a conventional hotel, motel, etc., a conventional key is provided for each "guest" so as to provide free access to an assigned room wherein the key operates a locking structure associated with the room door in the normal manner. The same or identical key is then given to the next occupant. Security problems arise with such conventional systems in terms of unauthorized entry through the tampering of such locks. In addition, hotel keys are frequently lost or misappropriated thereby frequently requiring the propietors of the hotel to change the lock of a given door in order to insure that unauthorized entry is not easily accomplished if such "lost" key was in fact stolen.

In order to overcome problems associated with the above type conventional locking structures utilized in hotels, etc., the prior art includes attempts to devise more elaborate security systems. Particularly, U.S. Pat. No. 3,763,676 to Schachter, and 3,842,629 to Pazer et al are both directed to a remotely programmable lock structure provided for use with a key which itself may be altered to vary the "code" necessary to open a given locking facility. More particularly, the systems and structures disclosed in the aforementioned patents are particularly adapted for the application to hotels, security areas, and the like, wherein it is desirable to periodically change the configuration of the key which will open one or more locks. For example, in the case of hotels, room keys are frequently lost, stolen or copied presenting substantially risks of theft to hotel guests. Both economic and practical considerations preclude the manual changing of lock combinations in an effort to prevent such theft. It is also acknowledged that certain electronic systems wherein the key consists of a card having a magnetic punched hole or embossed code thereon have also been proposed but frequently, such systems are not suitable for hotel operations. This is based on the questionable belief that power is generally required to release the door latch thereby presenting both practical and safety problems in case of a power failure.

The U.S. patent to Hogan, U.S. Pat. No. 3,774,422 discloses an electronic locking arrangement including a strike latch for locking engagement with a latch bolt of a door. Stop means are provided to inactivate the strike latch and maintain it in its locking position while mechanical puller means disengages he stop mean in response to electronic actuating means.

Accordingly, based on the above, the prior art is replete with security systems which attempt to overcome certain problems associated with the security arrangement and associated locking assemblies used in conventional, modern-day hotel facilities. However, there is still a need for a security system which is capable of totally being controlled, operated and programmed from a remote location, such as a hotel office using computer facilities and processing hardware which is currently available. Each locking assembly associated with each hotel room door, or other closure, may be controlled and programmed for authorized entry only through the presentation of a preset code. Also, security utilizing a preferred system of the type described hereinafter is enhanced in that attempted unauthorized entry or tampering with the activating means of the present invention can be indicated by an alarm means associated with the computer and/or independent thereof. An automatic monitoring of each of the locking assemblies and associated activating means of the subject security installation may be momentarily checked to determine the attempted point of unauthorized entry.

SUMMARY OF THE INVENTION

The present invention is directed towards a security system of the type specifically adaptable for use in hotels wherein a plurality of doors serve as closures to prevent unauthorized entry into individual rooms. Further, the security system of the present invention is particularly adaptable for enhancing security by means of programming in a different preset code after an occupant has vacated and prior to a new occupant occupying the leased room or facility.

More specifically, an actuating means comprises an actuating plate including a plurality of finger operated switches each representative of a different digit, preferably from 1 through 0, wherein a preset code may be applied to the activating means by depressing the designated finger button. For example, a code "567" assigned to a guest in a hotel has been precoded into an activating means by means of a centrally located computer facility interconnected to a processor means. The designated preset code of 567 would then be disclosed to the new occupant who may then press successively the buttons 5,6,7 on the actuating plate so as to position a lock, associated with a given closure door, into an unlocked position. Authorized entry is thereby accomplished. However, after the occupant has vacated the room, the central control facility, including the computer, may be activated as by a keyboard to the extend of "feeding in" to the activating means, by the processor means, such as a microprocessor, another preset code such as 123. The new preset code would then be disclosed to the next occupant of the room thereby enhancing the security of unauthorized entry to this room. Any other previously used preset code would not activate the lock assembly associated with the door or closure to provide entry.

Further, the system of the present invention includes an alarm structure which may be built into the computer or alternately, which may be a separate audible alarm located in the hotel office or at a control console for an operator of the system. Such an alarm system could be activated, through conventional telephone lines, when tampering was being performed at the activating plate or the lock itself or a wrong code was being attempted for entry into the activating means.

The activating means of the present invention may be generally of the type manufactured by Essex-Tec Corporation of Carpinteria, Calif. and sold under the trademark "Keyless Entry". However, the system of the present invention differs from the type of digital access control entry system of the type set forth above in that the activating means associated therewith is interconnected by a low voltage conductor to the microprocessor. The microprocessor is specifically structured to be capable of storing a given preset code which allows activation or positioning of a lock between a door locked and a door open position when the preset code is properly fed to the activating plate. Further, the microprocessor and activating means may be powered by a conventional power source possibly using a step down transformer of predetermined voltage so as not to overload the microprocessor or activating means itself. Also, the components of the system are interconnected to the central processing unit by conventional telephone lines thereby eliminating the necessity of partially rewiring a hotel facility.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature of the present invention, reference should be had to the following detailed description taken in connection with the accompanying drawing in which:

FIG. 1 is a front plan view of a representative door or like closure incorporating the activating assembly of the present invention.

FIG. 2 is a schematic representation of the various components of the subject security system and their relation to one another.

FIG. 3 is a front plan view along line 3—3 of FIG. 2.

Like reference numerals refer to like parts throughout the several views of the drawings.

DETAILED DESCRIPTION OF THE PREFERRED EMBODIMENT

As shown in FIG. 1, the security system of the present invention is designed to be used in combination with a door or like closure 10 of a multi-unit facility such as a hotel, motel, etc. Accordingly, the closure or door 10 has associated therewith an activation means generally indicated as 12 including an activating plate 14 (FIG. 2) positioned in an exposed location adjacent door 10. With reference to FIG. 3, the activating plate 14 includes a plurality of finger operated switches in the form of buttons 16 wherein the number of buttons are preferably equal to the numerals or digits 1 through 0.

A central control facility 13 may be located in a hotel office as indicated and further includes computer and data storage equipment such as 17 activated or controlled by a keyboard 15 and generally interconnected to each activating means 12 of each of a plurality of doors 10 by conventional telephone lines 30 and 30'.

This of course eliminates installation modifications of existing hotel facilities in that naturally each room therein is interconnected to a central switchboard or at least a central telephone facility also located in the hotel office herein designated at the central control facility 13. The activating means 12 including the activating plate 14 is connected by a low voltage conductor 18 to a microprocessor unit 20. Both the microprocessor and the activating means 12 are of course electrically powered and are connected to a conventional electrical power source by an outlet socket 22 wherein a connector plug 24 may be connected to the socket 22 in a conventional manner. Electrical conductor 26 serves to supply current flow to the microprocessor and eventually to the activating means 12 by means of the low voltage conductor 18. Further, with regard to the plug 14, a step down transformer may be utilized for the purpose of providing low voltage current to the microprocessor and activating means based on their respective operating characteristics. In an preferred embodiment, a power backup may be connected to the microprocessor and includes a battery source 22' interconnected to the microprocessor through takeoff conductor 26' as clearly shown in FIG. 2. Accordingly, due to the interconnection of the activating means 12 and the lock 21 by means of conductor 18 to microprocessor 20, any power failure in the hotel facility will not disable the system in that an electrical power source in the form of battery 22' may be used as an alternate power source in emergency situations at least for purposes of unlocking the door or closure 10.

The telephone indicated in FIG. 2 as 28 is representative of any conventional telephone facility found in each of the rooms of a given hotel wherein, as set forth above, a telephone line 30 interconnects the entire system including the activating means 12 and microprocessor 20 to the central control facility 13 such as at the hotel office. Similarly, the conductor 19 may in turn direct the computer and keyboard to any other common or conventionally known control facility such as a console through the telephone line 30.

For purposes of clarity, only a single door or closure 10 is shown and associated with respective activating means 12, microprocessor 20, and locking assembly including lock 21. However, each of the plurality of rooms in the hotel of course include the activating means 12, lock 21, and microprocessor 20, which are interconnected to the central control facility 13 by each of the plurality of telephone lines interconnecting the rooms to the hotel office as designated by 30'.

With regard to the microprocessor, it is specifically structured to be capable of storage of a preset code wherein each preset code is determined or defined by sequential numbers ranging from 1 to 0. For example, a code 123 may be assigned to a given door or closure 10 as shown in FIG. 1. Access or authorized entry to the door 10 may be accomplished by an occupant or guest of the hotel having first been informed of the preset code "123" then applying the code to the activating plate 14 by sequentially depressing the finger activated switches or buttons 16, 1,2,3. This in turn will activate or position lock 21 in its unlocked mode or position by means of interconnection with conductor 18' between the activating means 12 and lock 21. The lock 21 may be of any conventional electronically controlled or activating locking structure capable of being activated by low voltage current, wherein once the lock 21 is positioned in its unlocked mode, the door may be opened.

The computer means 17 and associated activating or control keyboard 15 are cooperatively structured such that each of the doors 10 having an activating means 12 and locking assembly 21 can be programmed or provided with a "new" preset code upon the arrival and occupancy of a new "guest" into the room of the hotel. In addition, the computer facility 17 may also have connected thereto a printer 40, of substantially conventional design such that if desired, a hard copy can be printed from the computer for purposes of billing and/or periodic monitoring of various codes assigned to various rooms or door closures 10.

Through utilization of the present system, it should therefore be apparent that certain services which are common in present day hotel facilities and which frequently result in delay and time wasted by the guest, can be eliminated. This includes but is not limited to the ability of a guest to make a reservation, relate to the hotel facility his credit card number and at that time receive a designated room and preset activating code for the room. This would allow a guest to totally bypass waiting in line for "check in" or "registration" which is frequently extremely time consuming especially during certain times of the day when guests frequently arrive or leave.

It will thus be seen that the important features of the above described invention and those made apparent from the description provided herein are efficiently obtained and since certain changes may be made in the above construction without departing from the scope of the invention, it is intended that all matter contained in the above description as shown in the accompanying drawings shall be interpreted as illustrative and not in a limiting sense.

It is therefore to be understood that the following claims are intended to cover all of the generic and specific features of the invention herein described, and all statements of the scope of the invention which as a matter of language, might be said to fall therebetween.

Now that the invention has been described, What is claimed is:

1. A security system for a hotel or like facility of the type primarily designed for the central programming and control of a plurality of locking assemblies each associated with a separate closure, said system comprising:
    (a) activating means included in each of said plurality of locking assemblies and structured for positioning said locking assemblies between a locked position and an unlocked position,
    (b) each of said actuating means electrically powered and interconnected to respective ones of said locking assemblies and including an actuating board comprising a plurality of finger operating switches sufficient in number to represent at least a minimal number of digits,
    (c) a central control facility connected to each of said activating means by telephone lines within the hotel or like facility,
    (d) a processing means connected to the telephone lines and interconnected between each of said activating means and said central control facilities,
    (e) each of said actuating means structured for operation upon a preset code being fed thereto through operation of said respective actuating board and said switches thereon,
    (f) said central control facility structured to selectively change said preset code in each of said activating means and said preset code defined by a preset sequence of numerals represented to said actuating means by actuation of a preset sequence of said switches,
    (g) whereby authorized access to any closure is accomplished by feeding said respective actuating means with said respective preset code and wherein the changing of said preset code can be accomplished centrally at said central control facility.

2. A system as in claim 1 wherein each of said processing means comprises a microprocessor interconnected between said respective actuating means and said central control facility through said respective telephone lines.

3. A system as in claim 2 wherein said microprocessor is structured to store a current preset code received from said central control facility, said actuating means interconnected to said microprocessor and cooperatively structured for positioning of said locking assembly between said locked position and said unlocked position.

4. An assembly as in claim 3 wherein each of said locking assemblies comprise a lock structure for locking engagement with a respective closure, said lock being electrically actuated and controlled and interconnected to said respective actuating means for electric actuation of said lock and selective positioning thereof between said locked position and said unlocked position relative to the respective closure.

5. An assembly as in claim 3 wherein each of said microprocessors is electrically powered and interconnected to a conventional electric power source, each of said actuating means and said respective locks electrically powered by interconnection to said respective microprocessor.

6. A system as in claim 1 wherein said central control facility comprises computer means including an information storage facility for storing each current preset code of each actuating means associated with each respective closure, said computer means structured for selective indication of any one of a plurality of preset codes assigned to any one of a plurality of closures.

7. A system as in claim 6 further comprising computer actuating means cooperatively structured with said computer means and connected thereto for the selective changing of any one of said plurality of preset codes, said computer means further structured to communicate a new preset code to a selected one of said actuating means through a respective one of said microprocessors over a respective interconnected telephone line.

8. A system as in claim 1 further comprising alarm means located at said central actuating facility and interconnected to each of said actuating means by said respective telephone lines for indication of attempted unauthorized entry through a respective closure.

9. A system as in claim 8 wherein said computer means is structured for indication of any one of said plurality of actuating means having attempted unauthorized entry thereat.

* * * * *